United States Patent Office 3,205,233
Patented Sept. 7, 1965

3,205,233
DIHYDROISOQUINOLINES
Richard Clarkson, Macclesfield, England, assignor to Imperial Chemical Industries Limited, London, England, a corporation of Great Britain
No Drawing. Filed May 13, 1963, Ser. No. 280,086
Claims priority, application Great Britain, June 4, 1962, 21,413/62
12 Claims. (Cl. 260—288)

This invention relates to heterocyclic compounds and more particularly it relates to dihydroisoquinoline derivatives which are useful as intermediates.

According to the invention we provide dihydroisoquinoline derivatives of the formula:

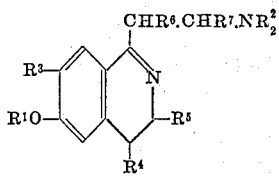

wherein $R^1$ and $R^2$, which may be the same or different, stand for alkyl radicals, $R^3$ stands for hydrogen or an alkoxy radical, $R^4$ stands for hydrogen or an alkyl or alkoxy radical, and $R^5$, $R^6$ and $R^7$, which may be the same or different, stand for hydrogen or alkyl radicals, and the salts thereof.

As a suitable value for $R^1$ or $R^2$ there may be mentioned, for example, an alkyl radical of not more than 6 carbon atoms, for example the methyl radical. As a suitable value for either $R^3$ or $R^4$ when it stands for an alkoxy radical there may be mentioned, for example, an alkoxy radical of not more than 6 carbon atoms, for example the methoxy radical. As a suitable value for either $R^4$, $R^5$, $R^6$ or $R^7$ when it stands for an alkyl radical there may be mentioned, for example, an alkyl radical of not more than 6 carbon atoms, for example the methyl radical.

Specific dihydroisoquinoline derivatives of the invention are, for example, 1-($\beta$-dimethylaminoethyl)-3,4-dihydro-6-methoxyisoquinoline, 1-($\beta$-dimethylaminoethyl)-3,4-dihydro-6-methoxy-4-methylisoquinoline, 1-($\beta$-dimethylaminoethyl)-3,4-dihydro-6-methoxy-3-methylisoquinoline, 1-($\beta$-dimethylaminoethyl)-3,4-dihydro-4,6-dimethoxyisoquinoline, 1-($\beta$-dimethylaminoethyl)-3,4-dihydro-6,7-dimethoxyisoquinoline and 1-($\beta$-dimethylaminopropyl)-3,4-dihydro-6-methoxyisoquinoline, and the salts thereof.

As suitable salts of the said dihydroisoquinoline derivatives there may be mentioned, for example, acid-addition salts, for example salts derived from inorganic acids, for example hydrochloric acid, or organic acids, for example oxalic or picric acid.

According to a further feature of the invention we provide a process for the manufacture of the said dihydroisoquinoline derivatives which comprises the ring-closure of an amide of the formula:

wherein $R^1$, $R^2$, $R^3$, $R^4$, $R^5$, $R^6$ and $R^7$ have the meanings stated above.

The ring-closure may be effected by the use of a ring-closing-agent known to be effective in the Bischler-Napieralski reaction, for example phosphorus pentachloride, phosphorus oxychloride, phosphorus pentoxide, aluminum chloride, thionyl chloride, zinc chloride-acetic anhydride, zinc chloride, alumina, phosphorus oxybromide or silicon tetrachloride. It may be effected in a substantially anhydrous inert diluent or solvent, for example substantially anhydrous chloroform, tetrahydronaphthalene, benzene, toluene or xylene, and it is conveniently effected at a temperature between 15° C. and 60° C., for example at ambient temperature.

The amides which are used as starting materials may be obtained by the interaction of the corresponding acrylamide derivative of the formula:

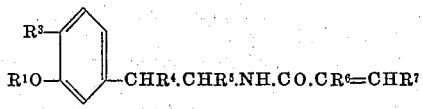

wherein $R^1$, $R^3$, $R^4$, $R^5$, $R^6$ and $R^7$ have the meanings stated above, with the corresponding amine of the formula $NHR_2^2$, wherein $R^2$ has the meaning stated above, in an inert diluent or solvent, for example benzene. The acrylamide derivatives themselves may be obtained by the interaction of the corresponding phenylethylamine derivative of the formula:

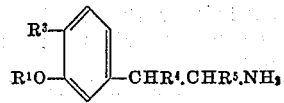

wherein $R^1$, $R^3$, $R^4$ and $R^5$ have the meanings stated above, with an acrylyl halide derivative of the formula

wherein $R^6$ and $R^7$ have the meanings stated above and X stands for a halogen atom, for example the chlorine atom, in an inert diluent or solvent, for example benzene.

The dihydroisoquinoline derivatives of the invention are useful as intermediates in that, as described in our co-pending application Ser. No. 280,723, filed May 15, 1963, they may be reacted with a cyclopentan-1,3-dione or cyclohexan-1,3-dione derivative in the presence of a basic condensing agent to afford compounds of the formula:

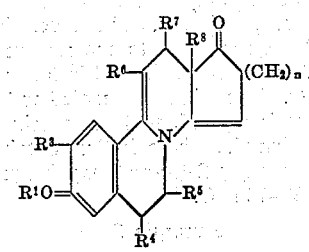

wherein $R^1$, $R^3$, $R^4$, $R^5$, $R^6$ and $R^7$ have the meanings stated above, $R^8$ stands for an alkyl radical, for example an alkyl radical of not more than 6 carbon atoms, for example the methyl radical, and $n$ stands for 1 or 2, which compounds have hypotensive properties and also, as described in our co-pending application 282,547, filed May 23, 1963, and now abandoned, are useful as intermediates in that they may be converted by reduction into compounds of the formula:

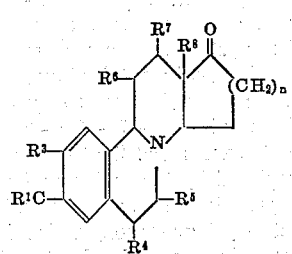

wherein $R^1$, $R^3$, $R^4$, $R^5$, $R^6$, $R^7$, $R^8$ and $n$ have the meanings stated above. The last-named compounds themselves have oestrogenic properties and they are useful as intermediates in that they may be converted into the 8-aza- or 8-aza-D-homo-analogues of known 19-nor steroids.

The invention is illustrated but not limited by the following examples in which the parts are by weight, except where otherwise stated:

*Example 1*

61.2 parts of N - (β - dimethylaminopropionyl) - 2-(m-methoxyphenyl)ethylamine oxalate are added to 270 parts of 25% w./v. aqueous potassium hydroxide solution at 10–15° C. The mixture is extracted three times, each time with 165 parts of chloroform. The combined chloroform extracts are washed with 100 parts of water, and evaporated under reduced pressure to dryness. The residue is dissolved in 200 parts of alcohol-free chloroform, and the solution is added to a suspension of 74.6 parts of phosphorus pentachloride in 200 parts of alcohol-free chloroform. The mixture is kept at ambient temperature during 18 hours. The solvent is evaporated under reduced pressure to dryness. 230 parts of isopropyl alcohol and 650 parts of dry ether are added to the residue. The mixture is filtered, and the solid residue is washed with ether and then dried. There is thus obtained 1-(β-dimethylaminoethyl)-3,4-dihydro-6-methoxyisoquinoline dihydrochloride hemihydrate, M.P. 124–126° C.

The N-(β-dimethylaminopropionyl) - 2 - (m-methoxyphenyl)ethylamine oxalate used as starting material may be obtained as follows A solution of 18.2 parts of acrylyl chloride in 176 parts of dry benzene is added during 1 hour to a solution of 30.2 parts of 2-(m-methoxyphenyl)ethylamine in 176 parts of dry benzene at 5–10° C., in an atmosphere of nitrogen. When the addition is completed, 105 parts of 2 N aqueous sodium hydroxide solution are added dropwise, the temperature of the reaction being kept at 5–10° C. during this addition. The mixture is then stirred for 1 hour at ambient temperature. The mixture is separated, and the benzene phase is evaporated under reduced pressure. There is thus obtained N-acrylyl-2-(m-methoxyphenyl)-ethylamine as an oil. This oil is dissolved in 132 parts of dry benzene, and to the resultant solution are added 47.2 parts by volume of a 5.5 N solution of dimethylamine in benzene. The resulting solution is heated in a sealed tube at 65° C. for 45 minutes. The solvent is evaporated under reduced pressure, and to the residue is added a solution of 27.7 parts of oxalic acid in 360 parts of boiling ethyl acetate. The mixture is cooled and filtered, and the solid residue is crystallised from a mixture of ethyl acetate and methanol. There is thus obtained N-(β-dimethylaminopropionyl)-2-(m-methoxyphenyl)ethylamine oxalate, M.P. 132–134° C.

*Example 2*

The process for the preparation of 1-(β-dimethylaminoethyl)-3,4-dihydro-6-methoxyisoquinoline dihydrochloride hemihydrate described in Example 1 is repeated except that the N - (β-dimethylaminopropionyl)-2-(m-methoxyphenyl)ethylamine oxalate is replaced by the molar equivalent of N - (β-dimethylaminopropionyl)-2-(m-methoxyphenyl)propylamine oxalate. There is thus obtained 1-(β-dimethylaminoethyl)-3,4-dihydro-6-methoxy-4-methylisoquinoline dihydrochloride as an oil.

The N-(β-dimethylaminopropionyl)-2 - (m - methoxyphenyl)propylamine oxalate used as starting material (M.P. 135° C.; crystallised from a mixture of ethyl acetate and ethanol) may be obtained by a process similar to that described in Example 1 for the preparation of N-(β-dimethylaminopropionyl) - 2 - (m - methoxyphenyl) ethylamine oxalate except that the 2-(m-methoxyphenyl) ethylamine is replaced by the molar equivalent of 2-(m-methoxyphenyl)propylamine and the solution of N-acrylyl-2-(m-methoxyphenyl)propylamine in benzene so obtained is heated in a sealed tube together with two molar equivalents of dimethylamine for 4 hours at 100° C.

*Example 3*

The process for the preparation of 1-(β-dimethylaminoethyl)-3,4-dihydro-6-methoxyisoquinoline dihydrochloride hemihydrate described in Example 1 is repeated except that the N-(β-dimethylaminopropionyl) - 2 - (m-methoxyphenyl)ethylamine oxalate is replaced by the molar equivalent of N-(β - dimethylaminopropionyl) - 2 - (m-methoxyphenyl)-1-methylethylamine oxalate. There is thus obtained 1-(β-dimethylaminoethyl)-3,4-dihydro-6-methoxy-3 - methylisoquinoline dihydrochloride, M.P. 104–106° C.

The N-(β-dimethylaminopropionyl)-2 - (m - methoxyphenyl) - 1 - methylethylamine oxalate used as starting material (M.P. 123° C.; crystallised from a mixture of ethyl acetate and ethanol) may be obtained by a process similar to that described in Example 2 for the preparation of N-(β-dimethylaminopropionyl) - 2 -(m- methoxyphenyl)propylamine oxalate except that the 2 - (m-methoxyphenyl)propylamine is replaced by the molar equivalent of 2-(m-methoxyphenyl)-1-methylethylamine.

*Example 4*

The process for the preparation of 1-(β-dimethylaminoethyl)-3,4-dihydro-6 - methoxyisoquinoline dihydrochloride hemihydrate described in Example 1 is repeated except that the N-(β - dimethylaminopropionyl) - 2 - (m-methoxyphenyl)ethylamine oxalate is replaced by the molar equivalent of N-(β-dimethylaminopropionyl)-2-methoxy - 2 - (m - methoxyphenyl)ethylamine oxalate. There is thus obtained 1-(β-dimethylaminoethyl)-3,4 - dihydro-4,6-dimethoxyisoquinoline dihydrochloride as an oil. This dihydrochloride is dissolved in water, the solution is strongly basified with 32% w./v. aqueous sodium hydroxide solution, and the resulting mixture is extracted three times with 150 parts of chloroform. The combined chloroform extracts are dried over anhydrous magnesium sulphate and then evaporated to dryness. 1 part of the residue is dissolved in 10 parts of tetrahydrofuran. Excess of a saturated solution of picric acid in tetrahydrofuran is added, ethanol is added to the solution until crystallisation is complete, and the mixture is filtered. There is thus obtained, as solid residue, 1-(β-dimethylaminoethyl) - 3,4 - dihydro - 4,6 - dimethoxyisoquinoline dipicrate, M.P. 137–139° C.

The N-(β-dimethylaminopropionyl)-2-methoxy-2 - (m-methoxyphenyl)ethylamine oxalate used as starting material (M.P. 106–107° C.; crystallised from a mixture of ether and tetrahydrofuran) may be obtained by a process similar to that described in Example 2 for the preparation of N-(β-dimethylaminopropionyl)-2-(m - methoxyphenyl)propylamine oxalate except that the 2-(m-methoxyphenyl)propylamine is replaced by 2-methoxy-2-(m-methoxyphenyl)ethylamine.

*Example 5*

The process for the preparation of 1-(β-dimethylaminoethyl)-3,4-dihydro-6-methoxyisoquinoline dihydrochloride hemihydrate described in Example 1 is repeated except that the N-(β-dimethylaminopropionyl) - 2 - (m-methoxyphenyl)ethylamine oxalate is replaced by the molar equivalent of N-(β-dimethylaminopropionyl)-2-(3,4-dimethoxyphenyl)ethylamine oxalate. There is thus obtained 1-(β-dimethylaminoethyl)-3,4-dihydro - 6,7 - dimethoxyisoquinoline dihydrochloride, M.P. 170° C. (crystallised from a mixture of methanol and ether).

The N-(β-dimethylaminopropionyl)-2-(3,4-dimethoxyphenyl)ethylamine oxalate used as starting material (M.P. 142–143° C.; crystallised from a mixture of ethyl acetate and ethanol) may be obtained by a process similar to that described in Example 2 for the preparation of N-(β-dimethylaminopropionyl)-2 - (m - methoxyphenyl) propylamine oxalate except that the 2 - (m - methoxyphenyl)propylamine is replaced by 2-(3,4-dimethoxyphenyl)ethylamine and the heating together with dimethylamine is carried out for 2 hours only.

Example 6

The process for the preparation of 1-(β-dimethylaminoethyl)-3,4-dihydro-6-methoxyisoquinoline dihydrochloride hemihydrate described in Example 1 is repeated except that the N-(β-dimethylaminopropionyl)-2-(m-methoxyphenyl)ethylamine oxalate is replaced by the molar equivalent of N-(β-dimethylaminobutyryl)-2-(m-methoxyphenyl)ethylamine oxalate and the reaction mixture is kept at ambient temperature for 5 days. There is thus obtained 1-(β-dimethylaminopropyl)-3,4-dihydro-6-methoxyisoquinoline dihydrochloride, M.P. 111–112° C. (crystallised from a mixture of methanol and ether).

The N-(β-dimethylaminobutyryl)-2-(m-methoxyphenyl)ethylamine oxalate used as starting material may be obtained as follows:

1 part of N-crotonyl-2-(m-methoxyphenyl)-ethylamine is dissolved in 30 parts of ethanol, and to this solution 2.3 parts by volume of a 4 N solution of dimethylamine in benzene are added. The resulting solution is heated in a sealed tube at 100° C. for 4 hours. The solvent is evaporated under reduced pressure, the residue is dissolved in 10 parts of ethyl acetate, and to this solution there is added a solution of 0.5 part of anhydrous oxalic acid in 20 parts of boiling ethyl acetate. The mixture is cooled and filtered, and the solid residue is crystallised from a mixture of ethyl acetate and ethanol. There is thus obtained N-(β-dimethylaminobutyryl)-2-(m-methoxyphenyl)ethylamine oxalate, M.P. 102–104° C.

The N-crotonyl-2-(m-methoxyphenyl)ethylamine used as starting material [M.P. 66° C.; crystallised from petroleum ether (B.P. 60–80° C.)] may be obtained by a process similar to that described in Example 1 for the preparation of N-acrylyl-2-(m-methoxyphenyl)ethylamine except that the acrylyl chloride is replaced by the molar equivalent of crotonyl chloride.

What we claim is:

1. A dihydroisoquinoline selected from the group consisting of dihydroisoquinolines having the formula:

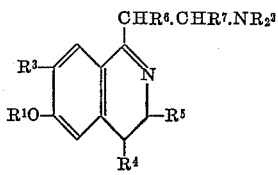

wherein $R^1$ and $R^2$ are each alkyl of from 1 to 6 carbon atoms; $R^3$ is selected from the group consisting of hydrogen and alkoxy of from 1 to 6 carbon atoms; $R^4$ is selected from the group consisting of hydrogen, alkyl of from 1 to 6 carbon atoms and alkoxy of from 1 to 6 carbon atoms; and $R^5$, $R^6$ and $R^7$ are each selected from the group consisting of hydrogen and alkyl of from 1 to 6 carbon atoms and the acid addition salts thereof.

2. A dihydroisoquinoline according to claim 1 wherein $R^1$ and $R^2$ are each alkyl of from 1 to 6 carbon atoms and $R^3$, $R^4$, $R^5$, $R^6$ and $R^7$ are each hydrogen.

3. A dihydroisoquinoline according to claim 1 wherein $R^1$, $R^2$ and $R^4$ are each alkyl of from 1 to 6 carbon atoms; and $R^3$, $R^5$, $R^6$ and $R^7$ are each hydrogen.

4. A dihydroisoquinoline according to claim 1 wherein $R^1$, $R^2$ and $R^5$ are each alkyl of from 1 to 6 carbon atoms and $R^3$, $R^4$, $R^6$ and $R^7$ are each hydrogen.

5. A dihydroisoquinoline according to claim 1 wherein $R^1$ and $R^2$ are each alkyl of from 1 to 6 carbon atoms, one of the $R^3$ and $R^4$ substituents is alkoxy of from 1 to 6 carbon atoms and the other R substituents are each hydrogen.

6. A dihydroisoquinoline according to claim 1 wherein $R^1$, $R^2$ and $R^7$ are each alkyl of from 1 to 6 carbon atoms and $R^3$, $R^4$, $R^5$ and $R^6$ are each hydrogen.

7. 1-(β-dimethylaminoethyl)-3,4-dihydro-6-methoxyisoquinoline.

8. 1-(β-dimethylaminoethyl)-3,4-dihydro-6-methoxy-4-methylisoquinoline.

9. 1-(β-dimethylaminoethyl)-3,4-dihydro-6-methoxy-3-methylisoquinoline.

10. 1-(β-dimethylaminoethyl)-3,4-dihydro-4,6-dimethoxyisoquinoline.

11. 1-(β-dimethylaminoethyl)-3,4-dihydro-6,7-dimethoxyisoquinoline.

12. 1-(β-dimethylaminopropyl)-3,4-dihydro-6-methoxyisoquinoline.

References Cited by the Examiner

Badger: The Chemistry of Heterocyclic Compounds, pp. 327–328, 1961.

Organic Reactions, vol. VI, pp. 98 and 108, 1951.

NICHOLAS S. RIZZO, *Primary Examiner.*